US006959013B1

(12) United States Patent
Müller et al.

(10) Patent No.: US 6,959,013 B1
(45) Date of Patent: *Oct. 25, 2005

(54) COMMUNICATION NETWORK

(75) Inventors: Thomas Müller, Köln (DE); Olaf J. Joeressen, Düsseldorf (DE); Markus Schetelig, Essen (DE)

(73) Assignee: Nokia Mobile Phones Limited, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/404,654

(22) Filed: Sep. 24, 1999

(30) Foreign Application Priority Data

Sep. 24, 1998 (DE) .................................... 9820861

(51) Int. Cl.[7] ............................ H04J 3/06; G08C 17/00
(52) U.S. Cl. ..................... 370/512; 370/510; 370/503; 370/350; 370/311
(58) Field of Search ............................... 370/509–512, 370/311–312, 350, 336, 345–347, 503, 328–329, 370/465, 337; 375/362–366, 368, 240.28; 348/500, 512, 518; 455/515, 500, 68, 574

(56) References Cited

U.S. PATENT DOCUMENTS

| | | | | |
|---|---|---|---|---|
| 4,201,892 | A | * | 5/1980 | Schmidt ...................... 370/321 |
| 4,413,338 | A | | 11/1983 | Renoulin et al. ............ 370/458 |
| 4,677,617 | A | | 6/1987 | O'Connor et al. ........... 370/511 |
| 4,964,121 | A | | 10/1990 | Moore .......................... 370/311 |
| 5,228,026 | A | | 7/1993 | Albrow et al. .............. 370/280 |
| 5,289,178 | A | | 2/1994 | Schwendeman ........... 340/7.58 |
| 5,361,397 | A | | 11/1994 | Wright |
| 5,550,992 | A | * | 8/1996 | Hashimoto ................... 370/337 |
| 5,561,712 | A | | 10/1996 | Nishihara ............... 379/355.01 |
| 5,565,923 | A | * | 10/1996 | Zdepski ................. 375/240.26 |
| 5,625,351 | A | | 4/1997 | Willard et al. ......... 340/825.52 |
| 5,625,629 | A | * | 4/1997 | Wenk ......................... 370/347 |
| 5,694,542 | A | * | 12/1997 | Kopetz ......................... 714/49 |
| 5,745,860 | A | | 4/1998 | Kallin ......................... 455/574 |
| 5,760,699 | A | * | 6/1998 | Saka et al. ............. 340/825.21 |
| 5,761,617 | A | | 6/1998 | Yonekura et al. |
| 5,930,366 | A | * | 7/1999 | Jamal et al. ................... 380/48 |
| 5,991,330 | A | * | 11/1999 | Dahlman et al. ........... 375/200 |

(Continued)

FOREIGN PATENT DOCUMENTS

EP          0726508          8/1986

(Continued)

OTHER PUBLICATIONS

A. Salkintzis, et al, "An In-Band Power Saving Protocol for Mobile Data Networks", IEEE Transactions on Communications, vol. 46, No. 9, Sep. 1998, pp. 1194-1205.

*Primary Examiner*—Chi Pham
*Assistant Examiner*—Ronald Abelson
(74) *Attorney, Agent, or Firm*—Antonelli, Terry, Stout and Kraus, LLP.

(57) ABSTRACT

A transmitter for transmitting an intermittent sequence of messages to maintain synchronization between the transmitter and a receiver. The transmitter includes control apparatus which provides messages for transmission, each message forms part of a sequence of messages and includes control information and timing information, and transmission apparatus which transmits each message. A receiver for synchronizing with a sequence of the transmitted messages. The receiver includes receiver and synchronization apparatus responsive, when enabled, to the control information in the message to indicate to the control apparatus reception of the message. The control apparatus controls power conservation by disabling the receiver and synchronization apparatus for a period of time dependent upon the timing information and enabling the receiver and synchronization apparatus to receive a following message in the sequence.

45 Claims, 3 Drawing Sheets

U.S. PATENT DOCUMENTS

| | | | |
|---|---|---|---|
| 6,014,376 A | 1/2000 | Abreu et al. | 370/350 |
| 6,094,429 A * | 7/2000 | Blanchette et al. | 370/347 |
| 6,144,656 A | 11/2000 | Kinnunen et al. | 370/347 |
| 6,256,334 B1 * | 7/2001 | Adachi | 375/132 |
| 6,310,558 B1 | 10/2001 | Minami | 340/825.02 |
| 6,622,011 B1 * | 9/2003 | Joeressen et al. | 455/88 |
| 6,639,905 B1 * | 10/2003 | Muller et al. | 370/336 |

FOREIGN PATENT DOCUMENTS

| | | |
|---|---|---|
| EP | 0711089 | 10/2001 |
| GB | 2115195 | 9/1983 |
| GB | 2172176 | 9/1986 |
| WO | 9501697 | 1/1995 |
| WO | 9527273 | 10/1995 |

* cited by examiner

COMMUNICATION NETWORK

BACKGROUND OF INVENTION

The present invention relates to the use of an intermittent sequence of messages to maintain synchronisation between a transmitter and at least one receiver in a communication network. In particular, it relates to transmitters and receivers for use in such a network.

In a communication network comprising a plurality of transceivers it may be necessary to keep the transceivers synchronised so that they use the same timing for communicating between each other. One transceiver may act as a master defining the timing for the communication system with the others acting as slaves and keeping synchronised with the timing of the master. It may be desirable to keep power consumption of the slaves as low as possible.

One way of maintaining synchronisation within the network is for the master to transmit a periodic sequence of single beacon messages, with a fixed time interval between the beacon messages. A beacon message may be a radio packet. The slaves periodically listen, every fixed time interval, for a beacon message. The periodic reception of a beacon message from the master allows the slave to compare its timing with that of the master and to adjust its timing to maintain synchronisation. Furthermore, as the sequence is periodic, power consumption can be reduced if the slave receiver does not attempt to receive beacon messages in the interval between beacon messages. Consequently, the slave receivers may listen for a beacon message in a listening window of fixed duration centred at the time a beacon message is expected to be received, once every fixed time interval.

There are some problems with such a system. The system is susceptible to the loss of beacon messages. Loss may arise from interference or multipath propagation causing degradation of the beacon message such that it is not received in the listening window of the receiver. Loss may also arise if the timing of the master is varied. Such variation may be desirable when a transceiver is part of a host device such as a mobile phone which operates with a timing system which is not synchronised to the master. It may be useful to synchronise the host timing and the master timing by shifting the timing of the master so that it coincides with the host's timing.

It would be desirable to improve synchronisation within a communications network.

SUMMARY OF INVENTION

According to one aspect of the present invention there is provided transmitter, for transmitting an intermittent sequence of messages to maintain synchronisation between the transmitter and at least one receiver, comprising:

control means arranged to provide messages for transmission, each of said messages forming part of said sequence of messages and comprising control information for effecting synchronisation, including timing information, wherein said timing information is dependent upon when the transmission of a following message in the sequence occurs; and transmission means, responsive to said control means, for transmitting each of said messages.

According to another aspect of the present invention there is provided a receiver, for synchronising with a sequence of transmitted messages each comprising control information including timing information, comprising:

control means arranged to control the operation of the receiver in dependence on received ones of the transmitted messages;

a clock for providing a time reference to the control means; and receiver and synchronisation means responsive, when enabled, to the control information in a received message to indicate to the control means the reception of said message, wherein said control means is arranged to disable said receiver and synchronisation means for a period of time dependent upon the timing information in said received message and to enable said receiver and synchronisation means to receive a following message in the sequence.

According to a further aspect of the present invention there is provided a receiver, for synchronising with a sequence of transmitted messages each comprising control information including timing information, comprising:

control means arranged to control the operation of the receiver in dependence on received ones of said transmitted messages;

a clock for providing a time reference to the control means; and receiver and synchronisation means responsive to the control information in a received message to indicate to the control means the reception of said message, wherein said control means is arranged to enable power conservation within the receiver for a period of time dependent upon the timing information in said received message, said period of time being such that power conservation is disabled to receive a following message in the sequence.

It will be appreciated that in embodiments of the invention, messages in the sequence of messages are used to indicate to the receiver when a following message in the sequence will arrive. Such indication may involve indicating a time period between messages, indicating the change to a time period between messages or indicating that no change to a time period between messages is required. Embodiments of the invention therefore provide flexible means of establishing and maintaining synchronisation.

BRIEF DESCRIPTION OF DRAWINGS

For a better understanding of the present invention and to understand how the same may be carried into effect reference will now be made to the accompanying drawings in which.

DETAILED DESCRIPTION OF AN EMBODIMENT OF THE INVENTION

Figure 1:
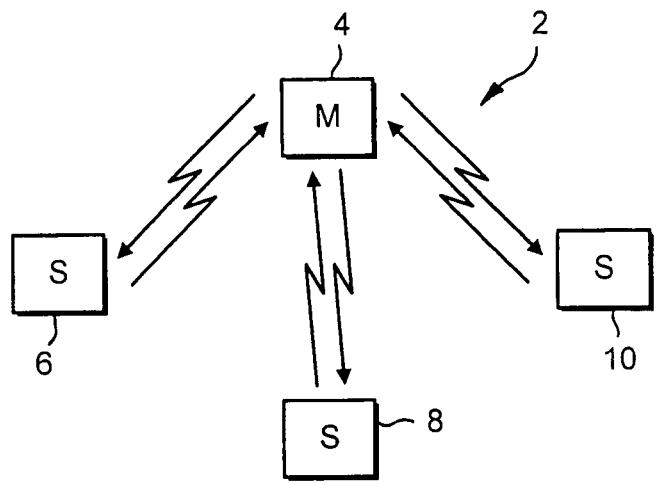
FIG. 1 illustrates a communications network including a master and slave units.

FIG. 1 illustrates a network 2 of radio transceiver units, including a master unit 4 and slave units 6, 8 and 10, communicating by transmitting and receiving radio packets. The master unit is the transceiver unit which initiates the connection of a slave to the network. There is only one master in a network. The network operates in a time division duplex fashion. The transceiver units are synchronised to a common time frame determined by the master unit 4. This time frame consists of a series of time slots of equal length. Each radio packet transmitted in the network has its start aligned with the start of a slot and a single packet is transmitted in the network at a time. When the master unit is performing point-to-point communication a transmitted radio packet is addressed to a particular transceiver which replies to the master unit by transmitting a radio packet addressed to the master unit in the next available time slot. When the master unit is performing point to multi-point communication a transmitted radio packet is addressed to all transceiver units. Any time misalignment between the master and a slave is corrected by adjusting the timing of the slave.

The transceivers transmit and receive, in this example, in a microwave frequency band, illustratively 2.4 GHz. The network reduces interference by changing the frequency at which each radio packet is transmitted. A number of separate frequency channels are assigned each with a bandwidth of 1 MHz, and the frequency may hop at a rate of 1600 hops/s. The frequency hopping of the transceivers communicating in or joining the network is synchronised and controlled by the master unit. The sequence of hopping frequencies is unique for the network and is determined by a unique identification of the master unit. Each transceiver unit has a unique identification, the Unit ID, henceforth referred to as the Slave ID for the slave units and the Master ID for a master unit.

The network is a radio frequency network suitable for transmitting voice information or data information between transceivers. The transmissions made are of low power, for example 0 to 20 dBm, and the transceiver units can effectively communicate over the range of a few centimeters to a few tens or hundred of meters. The master unit has the burden of identifying the other transceiver units within its transmission range and the burden of paging a transceiver unit to set up a communication link between the master unit and that slave unit. Each of the slave units has a low power modes in which it neither transmits nor receives and other modes in which it receives and then responds to radio packets addressed to it by the master unit. A slave unit may remain in the low power mode except when transmitting or receiving.

Figure 2:
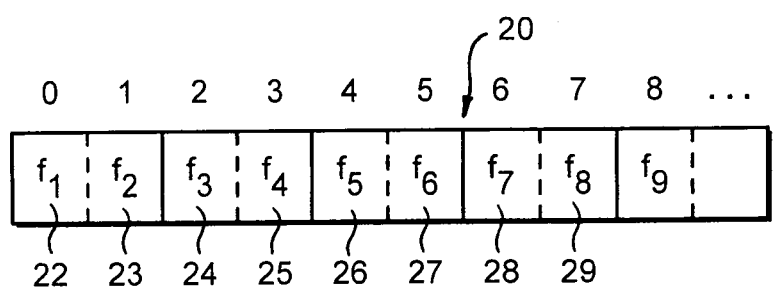
FIG. 2 illustrates the time frame of the communications network.

Referring to FIG. 2, a frame 20 is illustrated. This frame 20 is the common time frame used by the network 2 and controlled by the master unit 4. The frame illustratively has slots 22 to 29. The slots designated by even numbers are reserved. Only the master unit can begin transmitting a radio packet aligned with the start of the even numbered slots. The slots designated by odd numbers are reserved. Only radio packets transmitted by a slave, that is radio packets addressed for reception by the master unit can have their start aligned with the start of the odd numbered slots. Each slot is allocated a different one of a sequence of hopping frequencies. It is however, possible for a radio packet to extend over a number of slots and in this case the frequency at which the packet is transmitted remains constant at that allocated to the slot at the start of the packet. A slot has a constant time period and is typically 625 microseconds.

Figure 3:
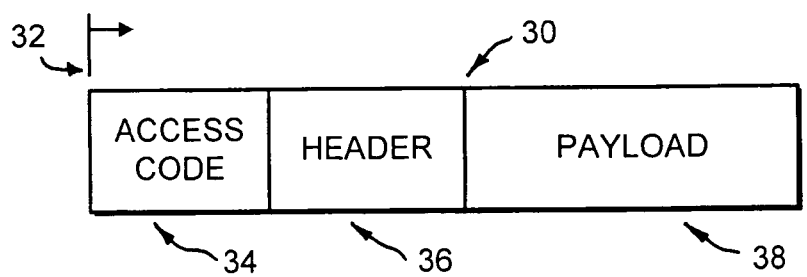
FIG. 3 illustrates a radio packet.

Referring to FIG. 3, a typical radio packet 30 is illustrated. The radio packet has a start 32 and contains three distinct portions: a first portion contains an Access Code 34, a second portion contains a Header 36 and a third portion contains a Payload 38.

The Access Code is a series of symbols used in the network to identify the start of a radio packet. It has a fixed length. The Access Code may comprise a Master ID, a Slave ID or an Inquiry Access Code. In a normal communication mode, the master and slave units use the Master ID as the Access Code. As there is only one master unit in a network, the Master ID identifies the network. When the master unit is in a Page Mode and is paging a particular slave unit to set up a communication link between itself and the slave unit, the Slave ID is used as the Access Code when the master addresses the slave and the slave replies. When the master unit is in an Inquiry Mode, the Inquiry Access Code is used as the Access Code when the master unit addresses the transceiver units and when a unit replies. The Inquiry Access Code identifies a packet as one to which all transceiver units must respond by transmitting their Slave ID.

The header 36 may or may not be present. If present, it has a fixed length. The header contains control words. The local address (L_ADDR) is a word uniquely identifying a slave within a network. The local address is assigned to a slave unit by the master unit when the master unit joins the slave to the network. The all zero L_ADDR is reserved for broadcast purposes. The packet identification word (PK_ID) specifies the features of the radio packet 30. PK_ID specifies whether a payload is present and its size and whether the payload contains data or transceiver control information.

The payload 38 carries either transceiver control information or voice/data information. The payload is of variable length and may be absent. When a slave unit receives a packet transmitted by a master unit in the Inquiry Mode it transmits a packet containing transceiver control information in its payload. This controlling radio packet has a payload contained at least two control words. The first is the Unit ID (SLAVE ID) of the slave unit and the second is the value (SLAVE CLK) representing the local time kept by a clock in the slave unit. The controlling radio packet is used to allow the master to establish frequency and timing synchronisation with the slave. When a master unit is in the Page Mode it transmits a radio packet to the paged slave containing transceiver control information in its payload. This controlling radio packet has a payload containing at least two control words. The first is the Unit ID (MASTER ID) of the master unit and the second is a value (MASTER CLK) representing the local time kept by a clock in the master unit. The controlling radio packet is used by the slave to establish timing and frequency synchronisation with the master.

Figure 4:
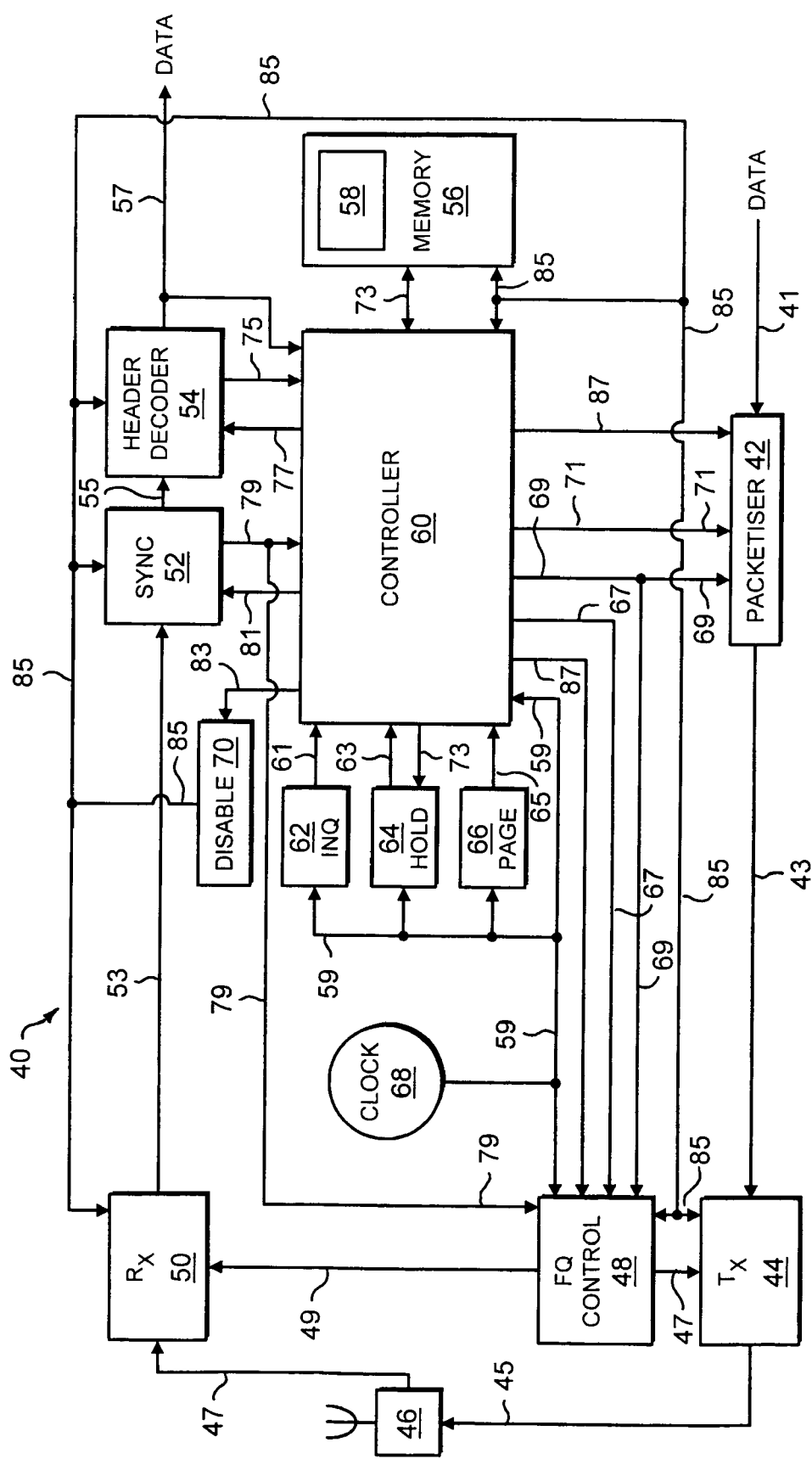
FIG. 4 illustrates a transceiver unit suitable for use as a master or slave.

Referring to FIG. 4, a schematic illustration of a transceiver unit is shown. Only as many functional blocks and interconnections are shown in this diagram as are necessary to explain in the following how a transceiver unit and the communication network operates. The transceiver unit 40 contains a number of functional elements including: an antenna 46, receiver 50, synchroniser 52, header decoder 54, controller 60, memory 56 having memory portion 58 storing the transceiver unit's Unit ID, disable circuitry 70, packetiser 42, clock 68, inquiry counter 62, hold counter 64, page scan counter 66, frequency hop controller 48 and transmitter 44. Although these elements are shown as separate elements they may in fact be integrated together and may be carried out in software or in hardware.

Data to be transmitted in the payload of a packet by the transceiver unit 40 is supplied as data signal 41 to the packetiser 42. Control information to be transmitted in the payload of a packet is supplied in a payload control signal 87 provided by the controller 60 to the packetiser 42. The packetiser 42 also receives an access code control signal 69 and a header control signal 71 from controller 60 which respectively control the Access Code 34 and the Header 36 attached to the payload to form the packet. The packetiser 42 places the data or control information into a packet 30 which is supplied as signal 43 to the transmitter 44. The transmitter 44 modulates a carrier wave in dependence upon the signal 43 to produce the transmitted signal 45 supplied to the antenna 46 for transmission. The frequency of the carrier wave is controlled to be one of a sequence of hop frequencies by a transmission frequency control signal 47 supplied by the frequency hop controller 48 to the transmitter 44.

The antenna 46 receives a radio signal 51 and supplies it to the receiver 50 which demodulates the radio signal 51 under the control of a reception frequency control signal 49 supplied by the frequency controller 48 to produce a digital signal 53. The digital signal 53 is supplied to the synchroniser 52 which synchronises the transceiver unit 40 to the time frame of the network. The synchroniser is supplied with an access code signal 81 specifying the Access Code of the packet which the transceiver unit is expecting to receive. The synchroniser accepts those received radio packets with Access Codes which correspond to the expected Access Codes and rejects those received radio packets with Access Codes that do not correspond to the expected Access Code. A sliding correlation is used to identify the presence and the start of the expected Access Code in a radio packet. If the radio packet is accepted then the radio packet is supplied to the header decoder 54 as signal 55 and a confirmation signal 79 is returned to the controller 60 indicating that the packet has been accepted by the synchroniser 52. The confirmation signal 79 is used by the controller in a slave unit to resynchronise the slave clock to the master clock. The controller compares the time at which a radio packet was received with the time at which the radio packet was expected to be received and shifts its timing to offset the difference. Such an offset may be achieved by varying the value of M_OFFSET stored in memory 56 by the value of the difference. The header decoder 54 decodes the header in the received packet and supplies it to the controller 60 as header signal 75. The header decoder 54, when enabled by a payload acceptance signal 77 supplied by the controller 60, produces a data output signal 57 containing the remainder of the radio packet, the payload 38. The controller responds to a zero value of L_ADDR in the header signal 75 to enable the header decoder. The data output signal 57 may contain transceiver control information. In this instance the data output signal 57 is supplied to controller 60 in response to the payload acceptance signal 77 provided by the controller 60.

The frequency-hopping controller 48 cycles through a sequence of frequencies. The transmission frequency control signal 47 and the reception frequency control signal 49 alternately control the transmitter 44 and the receiver 50. When the transceiver 40 is acting as a master, the receiver 50 is capable of receiving at frequencies determined by the odd values of the sequence and the transmitter is capable of transmitting at frequencies determined by the even values of the sequence. When the transceiver is acting as a slave unit the reverse is true. The frequency-hopping controller 48 receives the access code control signal 69 (also supplied to the packetiser 42) and an offset signal 67 from the controller 60 and a clock signal 59, which represents the time held in clock 68, from the clock 68. The offset signal 67 defines the value of an offset from the time held in the clock 68. This value may be null. The frequency-hopping controller combines the clock signal 59 and the offset signal 67 to emulate the time held in a clock offset by the value of the offset signal 67 from the clock 68. The sequence of frequencies through which the hopping controller 48 cycles is dependent upon the access code control signal 69. The position within the cycle is dependent upon the emulated time. When the access code control signal 69 provides the value MASTER ID a master unit frequency-hopping sequence is defined. When the access code control signal 69 provides the value SLAVE ID a slave unit frequency-hopping sequence is defined.

The clock 68 also supplies the clock signal 59 to the inquiry counter 62, the hold counter 64 and the page scan counter 66. Each of the counters contains values which are decremented with each clock cycle of the clock 68. The counters supply a control signal to the controller 60 when the decremented value reaches a predetermined threshold. The Inquiry counter 62 produces an inquiry control signal 61 every few seconds. This signal causes the transceiver unit 40 to enter the Inquiry Mode and the counter 62 to be reset. The hold counter 64 produces a hold disable signal 63 which causes the transceiver unit to exit a Hold Mode. The controller 60 initiates a Hold Mode by writing a value into the Hold counter 54 via write signal 73. The page scan counter 66 produces a page scan control signal 65 every few seconds. This signal causes the transceiver unit to enter the Page Scan Mode and the counter 66 to be reset.

Disable circuitry 70 provides an enable signal 85 to the receiver 50, the synchroniser 52, the header decoder 54, the frequency-hopping controller 48, the transmitter 44 and the packetiser 42, the memory 56 and the controller 60 in the absence of which these elements would be switched off. The disable circuitry responds to an asserted disable control signal 83 supplied by the controller 60 to disassert the enable signal 85.

The memory 56 has a portion 58 which permanently stores the Unit ID of the transceiver unit 40 and the common Inquiry Access Code. The remaining portion of the memory 56 can be written to by the controller 60. If the transceiver unit 40 is functioning as a slave unit, the memory 56 will additionally store the Master ID, a value M_OFFSET representing the difference between the slave unit's clock and the master unit's clock and the slave's address in the network, L_ADDR. If the transceiver unit 40 is functioning as a master unit, the memory 56 will additionally store for each slave unit participating in the network: the Slave ID; a value S_OFFSET representing the difference between the master unit's clock and that particular slave unit's clock and L_ADDR uniquely identifying the particular slave unit in the network.

It should be noted that the access code signal 81, the access code control signal 69 and the offset signal 67 remain the same for adjacent duplex time slots, and that the access code signal 81 and the access code control signal 69 will have the same values.

The transceiver unit has various modes of operation including: the Standby Mode, the Communication Mode, the Inquiry Mode, the Page Mode, and the Hold Mode. The operation of the controller 40 in each of these modes may depend upon whether the transceiver unit is functioning as a master or as a slave.

Standby Mode

Before a transceiver unit 40 has been connected to a network it is in Standby Mode. To enter this Mode the controller 60 activates the disable control signal 83. The receiver 50, the transmitter 44, the synchroniser 52, the frequency-hopping controller 48, the header decoder 54, the packetiser 42, disable circuitry 70 and the controller 60 are disabled and do not draw power. Only the clock 68 and the counters 62, 64 and 66 are operational. In this mode power consumption is very low.

Inquiry Mode

Before a master unit can set up a communication network or join a transceiver unit to an existing network it needs to 'know' what transceiver units are within its transmission range. The master unit broadcasts inquiry radio packets in even numbered time slots. Each of the packets has the Inquiry Access Code as its Access Code and the zero L_ADDR in its header. If a slave unit is within range and is in an Inquiry Scan Mode it will respond in an odd numbered time slot, by transmitting a packet which has the Inquiry Access Code as its Access Code and has, in its payload, the SLAVE ID and SLAVE CLK of the slave unit.

Paging

Before a master unit can join a transceiver to the communication network it needs to give the slave unit some network parameters in the payload of the paging radio packet. These parameters include: the MASTER ID so that the slave unit can recognise packets transmitted by the master unit and can emulate the master unit's frequency-hopping sequence; M_OFFSET so that the slave unit can keep in step with the master unit's time frame and frequency hopping; and L_ADDR so that the slave unit can recognise a packet addressed to it by the master unit. The master unit communicates these network parameters to the slave unit via a paging packet while emulating the slave unit's frequency-hopping sequence and keeping in step by emulating the slave's clock using SLAVE_ID as the value of access code control signal 69 and S_OFFSET as the value of offset signal 67. Once a communication link has been established between the master and slave they communicate using the master unit's frequency-hopping sequence. Each of the packets transmitted during paging has as its Access Code the SLAVE ID of the slave unit paged. The packets transmitted from master to slave unit are in even numbered time slots and the slave responds to the reception of these packets by transmitting packets in the associated duplex slot i.e. the immediately following odd numbered slot.

Communication Mode

In the communication mode, a slave can only transmit and must transmit in the slot immediately after that in which it was addressed. An exception to this is if the master unit is broadcasting, that is, transmitting to all slave units simultaneously. All packets transmitted in the communication mode have an Access Code determined by the MASTER ID and a frequency determined by the master unit's frequency-hopping sequence. The slave units emulate the master unit's frequency-hopping sequence using the stored value of MASTER ID as the access code control signal 69 and the stored value of M_OFFSET as the value of the offset signal 69 and synchronise their timing to the master unit using their own clock signal 59 and their stored value of M_OFFSET. The master addresses a particular slave unit by placing its unique address, L_ADDR, read from memory 56 in the header of a packet. The payloads of the packets transmitted may contain data or control information such as updated network parameters.

Hold Mode

In the Hold Mode, no data is transmitted for a previously defined time interval.

The slave unit in a Hold Mode maintains synchronisation to the master unit's time frame. In the Hold Mode a slave unit keeps the local address L_ADDR assigned by the master unit. The controller 60 initiates the Hold Mode by writing a value to the hold counter 64 via signal 73 and by enabling the disable circuitry 70. The controller deactivates the hold mode in response to the inquiry control signal 61, the hold disable signal 63 and the page scan control signal 65 respectively. The hold mode is initiated, for example, when in the communication mode, the master unit informs a slave unit that it will not receive a packet for a period of time SLEEP. The value of SLEEP is communicated to the slave unit in a payload and is supplied to the controller 60 via signal 57. The controller responds by writing the value SLEEP into the hold counter 64 and asserting the disable control signal 83. The slave unit thereby enters a low power mode, the hold mode. The hold mode may alternatively be activated by the controller 60 when the slave unit receives a radio packet addressed to another slave unit in the network. The controller via the header signal 75 and the value of PK_ID therein knows how long the network will be occupied by such a packet. The controller can enter the hold mode for a period at least as long as that equivalent to the time taken to transmit a packet having that size by writing an appropriate value into the hold counter 64. Additionally when the slave unit is not addressed in a particular slot in which the master unit can start transmitting, it will enter the hold mode for the remainder of that slot and the duration of the next slot.

Another mode similar to the Hold Mode is the Park Mode in which the slave unit's local address may be reallocated to another slave unit by the master unit. A slave is put in the Park Mode when it does not need to participate in the network but needs to stay synchronised to the networks time frame. In the Park Mode a slave gives up its assigned L_ADDR and it can be reused by the master. In the Hold Mode the ime at which the transceiver exits the Mode is predetermined, in the Park Mode it is not. The transceiver is woken up by the master.

Figure 5:
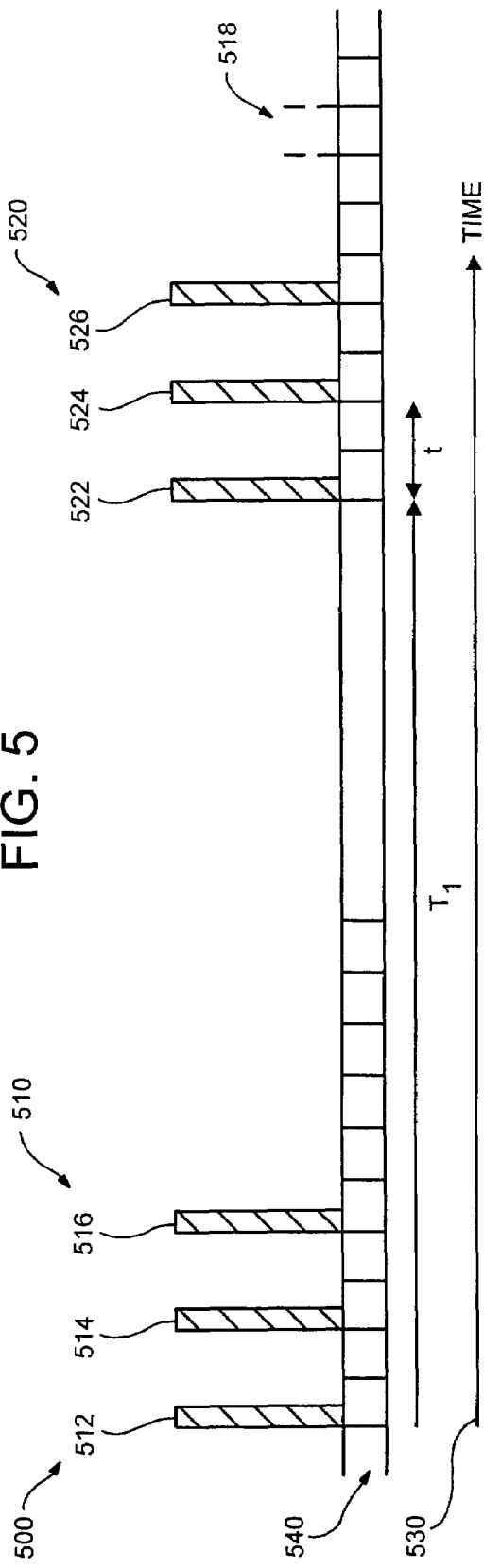
FIGS. 5 and 6 illustrate sequences of messages for synchronising transceiver units in the network.

Referring to FIG. 5, there is illustrated a sequence 500 of messages 512, 514, 516, 522, 524 and 526. These messages are transmitted by the master unit and are used by the slave units to maintain time synchronisation with the master unit and are used to wake up the slave units from the Park Mode. The time arrow 530 illustrates that the messages are transmitted by the master in order from left to right, with message 512 being transmitted first. The common time frame 540 used by the units in the network illustrates that each of the messages is transmitted by the master in even slots only.

The sequence 500 of messages includes a first group of messages 510 and a second group of messages 520. The first and second groups are separated by an interval of time T1. The first group 510 has a series of three messages: a first message 512, a second message 514, and a third message 516. The adjacent messages, that is, the first and second messages and the second and third messages are separated by the same time interval. The second group 520 of messages has a series of three messages: a first message 522, a second message 524 and a third message 526. The adjacent messages are separated by the same time interval, t.

A group of messages, for example, the second group 520, can be defined by its group parameters: the number of message packets per beacon group (N), the time interval between two adjacent message packets in the same group (t) and the time interval to the next beacon group (T1). N represents the number of messages in the group. t represents the interval of time separating adjacent messages in the group. T1 represents the interval of time separating the group in question from the group of messages immediately preceding it. A slave transceiver with knowledge of these parameters can, after receiving one of the messages in the preceding group, accurately predict when the messages of the next group will be transmitted. Consequently if a message is expected by a slave and it is not received, the slave can try and receive the adjacent message and so on, until there are no more messages expected from that group. Thus using a group of messages instead of a single message reduces the probability of the slave missing an opportunity to synchronise with or be woken up by the master due to packet degradation, loss or time shifting.

Each message is a radio packet. Each of the messages is transmitted with a frequency synchronised with the master hopping frequency. The messages are transmitted in the master's transmission slots, that is, the even numbered slots. Each message is aligned with the beginning of a slot. Each radio packet message has MASTER ID as its access code, has the zero (broadcast) value of L_ADDR in its header, and contains a payload. The contents of the payload depend on the message packet type. If the message does not vary or update the group parameters the payload need not contain control information and may contain data. If the message does vary or update the group parameters the payload contains control information identifying the new parameters or the variations to the current parameters. The control information in the ith message in a group may take many forms but will at least be indicative, to the receiver, of the time interval between that message and the next beacon group and may indicate that value or the value of the variation to the previous value. All the messages in the sequence 500 comprise timing information as each message controls whether the group parameters t and T1 will or will not be updated and hence whether the timing of the sequence will or will not change.

According to the preferred embodiment the ith beacon message in a group contains the control information N, Ti and t. The value of N and t are the same for all the messages in a group. The values of Ti vary for each of the successive message packets in a group by t, as each message packet is t closer to the next beacon group. Consequently referring to FIG. 5, the first, second and third message packets 512, 514 and 516 have as their time interval to the next beacon group the value T1, T2=T1-$t$, and T3=T1-2$t$ respectively. It would be possible to provide instead of the absolute values (Ti) of the time interval to the next beacon group the value T1 and an indication within the message packet whether it is the first, second or third message within the group.

Figure 6:
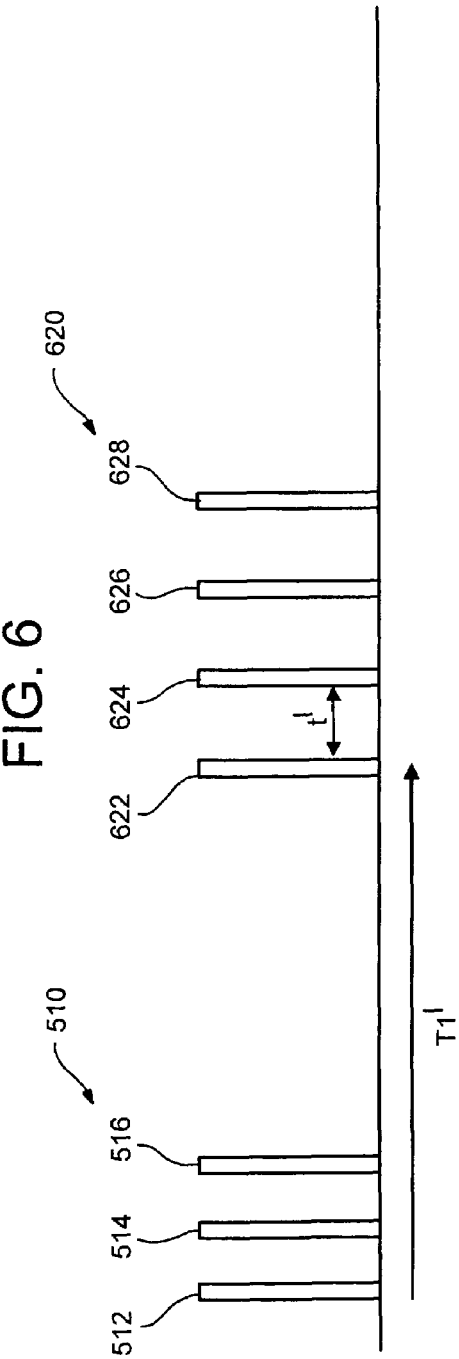

Referring to FIG. 6, the master may vary the group parameters between a first message group 510 and a second message group 620. The master informs the slave units of the variation via the message packets in the first message group. The first message group 510 is defined by the group paramerters N, t and T1 and the second group of messages is defined by the group parameters N', t' and T1'. Although the first group of messages is defined by the control information N, t and T1, each of the messages in the group comprises the control information defining the second group 620. For example, the first message 512 in the group contains the parameters N', t' and T1', the second message in the group comprises the parameters N', t' and T2'=T1'-$t$' etc. The second group 620 is defined by the new group parameters N', t', and T1'. Each message in the second group of parameters comprises the control information defining the third group of messages (not shown).

The second group 620 has a series of four messages 622, 624, 626 and 628 with adjacent messages separated by an interval t'. In this example the master has shifted the timing frame of the communication network by varying the time interval between a first message group 510 and the second following message group 620 by a value S, where S equals the difference between T1 and T1'. The shift S in synchronous systems is an integer number of time slots. The master may continue to transmit the first group of messages 510 with a periodicity T1, for a short while to ensure that any slave which may have inadvertently missed the first transmission of the first group does not loose synchronisation. If the shift value S is small and particularly if it is an integer multiple of t not exceeding Nt then no retransmission of the first group is required as there is some overlap between the messages of the second group and where the messages of the second group would be expected if no variation in the group parameters occurred. Although in this example, all the group parameters were varied it should be appreciated that any one or any combination of the group parameters may be varied. It is therefore possible to vary the parameters of the park mode and in particular to shift the time reference of the communication network without waking up and separately transmitting to the slaves.

Referring now to FIG. 4, the operation of a transceiver operating as a master unit to create the sequence of messages 500 will be explained. For the purposes of this explanation consider the master to have previously transmitted a first group of messages and to be about to transmit a second group of messages. The controller stores the group parameters N, T1 and defining the second group of messages in the memory 56. These parameters were transmitted in the first message of the first group of messages. The controller, when a period of time T1 has expired since the transmission of the first message in the first group of messages, initiates the transmission of the second group of messages. The controller controls the frequency at which transmission occurs via the access code control signal 69, the offset signal 67 and the clock signal 68. The controller provides the value of the MASTER ID read from the memory portion 58 as the access code control signal 67 and a null value as the offset signal 67. The controller provides the zero value of L_ADDR in the header control signal 71. The controller then determines which group parameters N', t' and T1' should define a third group of messages to be transmitted a period of time T1' after the transmission of the first message of the second group of messages. The controller places the values of the group parameters N', t' and T1' in the payload of a first packet of the second group as control information via packet control signal 87 and writes the parameters to memory 56. The first packet is transmitted by transmitter 44. The controller waits a period of time t and then places the values of the parameters N', t' and T2'=T1'-$t$ in the payload of a second packet as control information via packet control signal 87. The second packet is transmitted by the transmitter 44. The controller waits a period of time t and then places the values of the group parameters N', t' and T3'=T1'-2.$t$ in the payload of a third packet as control information via packet control signal 87. The third packet is transmitted by the transmitter 44. This process continues until the N packets of the second group have been transmitted. The controller then waits a period of time T1'-N.t before initiating the transmission of the next group of messages.

Referring now to FIG. 4, the operation of a transceiver operating as a slave unit synchronising with the sequence of messages 500 will be explained. In the park mode all the elements of the transceiver except the clock 68 and the counters 62, 64 and 66 are normally disabled by disable circuitry 70. When the hold counter 64 expires, the controller 60 disables the disable circuitry 70 for a predetermined period of time. The transceiver is able to receive transmitted messages during the reception window defined by the predetermined period of time. The shorter the reception window the lower the power consumption in the transceiver. The controller reads the value of MASTER ID and M_OFFSET from the memory 56 and supplies them as access code control signal 69 and offset signal 67 respectively to the frequency hopping controller 48. The frequency hopping controller causes the receiver 50 to receive at the same frequencies at which the master is transmitting. For the purposes of this example it is to be assumed that the receiver previously received the ith message in a first group of messages. This message contained a payload comprising as control information the parameters t, N and Ti defining the second group of messages. These parameters have been stored in memory 56 and the value of Ti written to the hold counter 64. The controller reads from memory 56 the group parameters (N, Ti and t) of the second group of messages which is about to be transmitted to the receiver. The reception window controlled by the controller may be centred at a time Ti after the transmission of the ith message in the first group. Consequently the receiver 50 is synchronised in time via signal 85 and synchronised in frequency via the reception frequency control signal 49 with the transmission of the second group of messages from the master.

The controller provides the value of MASTER ID to the synchroniser 52 via access code signal 81. If a packet having the correct access code is received in the reception window the controller is informed by confirmation signal 79. The controller compares the time at which the packet was received as indicated by the confirmation signal 79 with the time at which a packet was expected to be indicated as received by the confirmation signal and corrects M_OFFSET stored in memory 56 by the difference. Such a correction ensures any small drifts between the timing of the master and the timing of the slave are corrected each time a group of messages is transmitted by the master. The header decoder accepts the packet as it was broadcasted (L_ADDR zero) and passes the contents of the packet's payload to the controller via data output signal 57. The controller extracts the values of the third group's parameters from the payload and stores them in the memory 58. The receiver should receive the first message in the payload and the parameters stored to memory should be N', t' and T1', however, the first message may be missed and the ith message received (see below) and in this case the parameters stored in memory are N', t' and Ti'. The controller then writes the value of Ti to the hold counter 64 and activates disable circuitry 70 via disable control signal 83.

If a packet is not received in the reception window the controller activates disable circuitry 70 for a period of time t and then disables the circuitry for a predetermined duration thereby opening a second reception window. If a packet is not received in the second reception window, the controller activates disable circuitry for a period of time t and then disables the circuitry for a predetermined duration thereby opening a third reception window. This process continues until the N th reception window has been unsuccessfully opened. The controller then writes the value TN into the hold counter 64. Each group of messages within the sequence can perform a different function. All the messages have at least the access code of the master so that the synchroniser 52 can function correctly. The messages in a group allow a slave to synchronise with very little scan activity. The messages in a group may contain the group parameters which allow the slave to remain synchronised to the sequence. Such messages may change the group parameters or keep them the same. Alternatively, the messages within a group can act as wake up messages allowing the master to page them directly in a subsequent time slot. The payload of such a message contains three value. The value Ti indicates the time until the transmission of the next group in the sequence The SLAVE ID of the slave unit to be paged identifies the payload as addressed to a particular slave. The newly assigned L_ADDR for the slave allows a subsequent page message to be addressed to the appropriate slave. Alternatively, the messages in a group can contain data in their payloads and not carry any group parameters. These messages however indicate to a slave that the group parameters should not change.

Transceivers such as that illustrated in FIG. 4, may form part of different devices such as mobile phones, computers, pagers, a computer mouse, headsets, microphones etc. Such transceivers allow the devices to form a communication network and exchange data or control information via the network.

The preceding description describes a preferred implementation of the claimed invention in a preferred application, namely a low power radio frequency communications network. However, it should be appreciated that other implementations and applications may be utilised without departing from the scope of the invention as claimed.

What is claimed is:

1. A transmitter for transmitting an intermittent sequence of messages to maintain synchronization between the transmitter and at least one receiver, comprising:

control means arranged to provide messages for transmission, each of said messages forming part of said sequence of messages and comprising control information for effecting synchronization, including timing information, wherein said timing information is dependent upon when the transmission of a following message in the sequence occurs; and transmission means, responsive to said control means, for transmitting each of said messages, wherein said sequence of messages comprises a sequence of groups of messages each of said groups of messages comprising a plurality of messages in series, wherein said following message is a message in a following group, wherein said following group is the next group, and wherein said control means is arranged to vary the time between the transmission of a pair of successive groups of messages by an amount such that there is coincidence between the time of transmission of a message in the following group of the pair and the expected time of transmission, in the absence of a variation, of a message in the following group.

2. A receiver for synchronizing with a sequence of transmitted messages each comprising control information including timing information, comprising:

control means arranged to control the operation of the receiver in dependence on received ones of the transmitted messages;

a clock for providing a time reference to the control means; and receiver and synchronization means responsive, when enabled, to the control information in a received message to indicate to the control means the reception of said message, wherein said control means is arranged to disable said receiver and synchronization means for a period of time dependent upon the timing information in said received message and to enable said receiver and synchronization means to receive a following message in the sequence, and wherein said control means is arranged to compare the expected time of arrival of a message, provided by the timing information in a preceding received message, with the actual time of arrival of the message as indicated to the control means by the reception and synchronization means, and to offset said time reference provided by the clock in dependence on said comparison.

3. A receiver for synchronizing with a sequence of transmitted messages each comprising control information including timing information, comprising:
control means arranged to control the operation of the receiver in dependence on received ones of said transmitted messages;
a clock for providing a time reference to the control means; and
receiver and synchronization means responsive to the control information in a received message to indicate to the control means the reception of said message,
wherein said control means is arranged to enable power conservation within the receiver for a period of time dependent upon the timing information in said received message, said period of time being such that power conservation is disabled to receive a following message in the sequence, and
wherein said control means is arranged to compare the expected time of arrival of a message, provided by the timing information in a preceding received message, with the actual time of arrival of the message as indicated to the control means by the reception and synchronization means, and to offset said time reference provided by the clock in dependence on said comparison.

4. A transmitter, for transmitting a sequence of intermittent messages to maintain synchronization between the transmitter and at least one receiver, wherein said sequence of intermittent messages are in groups of messages, each group being separated from the next group by a first period of time and including of a plurality of messages in series, each of the plurality of messages in a group being separated from an adjacent message in that group by a second period of time, said transmitter comprising:
control means arranged to provide control messages for transmission which inform the at least one receiver of a variation in said sequence of intermittent messages, each of said control messages forming part of said sequence of intermittent messages and including control information for effecting synchronization after said variation, including parameters for informing variation in any one or more of the first period of time, the second period of time and the number of messages in a group; and
transmission means, responsive to said control means, for transmitting each of said intermittent messages,
wherein a control message has a payload including a first parameter specifying the first period of time after variation, a second parameter specifying the second period of time after variation and a third parameter specifying the number of messages in a group after variation.

5. A transmitter for transmitting an intermittent sequence of messages each of which is capable of synchronizing a clock in a receiver to a clock in the transmitter, wherein said sequential messages are in groups, each group being separated from the next group by a first period of time and comprising a plurality of messages in series, each of the plurality of messages in a group being separated from an adjacent message in that group by a second period of time, comprising:

transmission means for transmitting each of said sequential messages; and
control means arranged to provide, when there is a variation in the sequence of messages, control information, for transmission in at least one sequential message, that informs the at least one receiver of a variation in the sequence of messages, and thereby maintains, after the variation, the synchronization of the clock in the receiver to the clock in the transmitter, the control information including one or more parameters for informing a variation in one or more of the first period of time, the second period of time and the number of messages in a group,
wherein a control message has a payload comprising a first parameter specifying the first period of time after variation, a second parameter specifying the second period of time after variation and a third parameter specifying the number of messages in a group after variation.

6. A transmitter for transmitting an intermittent sequence of messages each of which is capable of synchronizing a clock in a receiver to a clock in the transmitter, wherein said sequential messages are in groups, each group being separated from the next group by a first period of time and comprising a plurality of messages in series, each of the plurality of messages in a group being separated from an adjacent message in that group by a second period of time, comprising:
transmission means for transmitting each of said sequential messages; and
control means arranged to provide, when there is a variation in the sequence of messages, control information, for transmission in at least one sequential message, that informs the at least one receiver of a variation in the sequence of messages, and thereby maintains, after the variation, the synchronization of the clock in the receiver to the clock in the transmitter, the control information including one or more parameters for informing a variation in one or more of the first period of time, the second period of time and the number of messages in a group,
wherein the messages in the intermittent sequence of messages comprise control messages that vary the sequence of intermittent messages and data messages having a payload containing data that do not vary the sequence of intermittent messages.

7. A transmitter as claimed in claim 6, wherein each group of messages including a control message, only contains control messages.

8. A receiver for synchronizing its clock substantially every first period of time via an intermittent sequence of messages, transmitted by a transmitter, wherein said sequence of intermittent messages are in groups of messages, each group being separated from the next group by a first period of time and comprising a plurality of messages in series, each message in a group being separated from an adjacent message in that group by a second period of time, comprising:
control means arranged to control the operation of the receiver in dependence on received ones of the transmitted intermittent sequence of messages comprising control information indicative of a variation in the sequence of intermittent messages;
a clock for providing a time reference to the control means; and receiver and synchronization means responsive, when enabled, to a received message to indicate to the control means the reception of said message, wherein said control means is arranged to disable said receiver and synchronization means for a period of time dependent upon the intermittent sequence, and any variation thereof, and to enable said receiver and synchronization means to receive a message in each of the groups in the sequence.

9. A receiver as claimed in claim 8, wherein the variation in the sequence of intermittent messages is communicated to the receiver by the reception of a control message as one of the intermittent sequence of messages, said control message including parameters for informing variation in any one or more of the first period of time, the second period of time and the number of messages in a group.

10. A receiver as claimed in claim 8, wherein the messages in the intermittent sequence of messages comprises control messages which vary the sequence of intermittent message and data messages having a payload containing data which do not vary the sequence of intermittent messages.

11. A receiver as claimed in any one of claims 8, arranged, while in Park Mode, to receive a wake up message for waking the receiver from Park Mode to receive a page message at a subsequent time wherein the wake up message is one of the intermittent sequence of messages.

12. A receiver as claimed in claim 8, wherein said control means enables said receiver and synchronization means, to receive a message in the sequence, for a predetermined duration.

13. A receiver as claimed in claim 12, wherein said control means in the absence of an indication from the receiving and synchronizing means that a due message has been received, re-enables said receiver and synchronization means to receive a following message.

14. A receiver as claimed in claim 8, wherein said control means enables said receiver and synchronization means, to receive a message in the sequence, for a predetermined duration and in the absence of an indication from the receiving and synchronizing means that a due message has been received, re-enables said receiver and synchronization means to receive a following message in the same group.

15. A receiver as claimed in claim 8, wherein said control means enables said receiver and synchronization means, to receive a message in the sequence, for a predetermined duration and in the absence of an indication from the receiving and synchronizing means that a due message has been received, re-enables said receiver and synchronization means to receive a following message in the following group.

16. A receiver as claimed in claim 15, wherein said control means re-enablement is intermittent, the interval between enablement depending upon the second time period for the group.

17. A computer comprising a receiver as claimed in claim 8.

18. A mobile telephone comprising a receiver as claimed in claim 8.

19. An accessory for a mobile telephone comprising a receiver as claimed in claim 8.

20. A receiver for synchronizing its clock substantially every first period of time via an intermittent sequence of messages, transmitted by a transmitter, wherein said sequence of intermittent messages are in groups of messages, each group being separated from the next group by a first period of time and comprising a plurality of messages in series, each message in a group being separated from an adjacent message in that group by a second period of time, comprising:

control means arranged to control the operation of the receiver in dependence on received ones of the transmitted intermittent sequence of messages comprising control information indicative of a variation in the sequence of intermittent messages;

a clock for providing a time reference to the control means; and receiver and synchronization means responsive, when enabled, to a received message to indicate to the control means the reception of said message, wherein said control means is arranged to disable said receiver and synchronization means for a period of time dependent upon the intermittent sequence, and any variation thereof, and to enable said receiver and synchronization means to receive a message in each of the groups in the sequence, wherein a control message has a payload comprising a first parameter specifying the first period of time after variation, a second parameter specifying the second period of time after variation and a third parameter specifying the number of messages in a group after variation and said receiver extracts said parameter values therefrom.

21. A receiver for synchronizing its clock substantially every first period of time via an intermittent sequence of messages, transmitted by a transmitter, wherein said sequence of intermittent messages are in groups of messages, each group being separated from the next group by a first period of time and comprising a plurality of messages in series, each message in a group being separated from an adjacent message in that group by a second period of time, comprising:

control means arranged to control the operation of the receiver in dependence on received ones of the transmitted intermittent sequence of messages comprising control information indicative of a variation in the sequence of intermittent messages;

a clock for providing a time reference to the control means; and receiver and synchronization means responsive, when enabled, to a received message to indicate to the control means the reception of said message, wherein said control means is arranged to disable said receiver and synchronization means for a period of time dependent upon the intermittent sequence, and any variation thereof, and to enable said receiver and synchronization means to receive a message in each of the groups in the sequence, wherein said control means is arranged to compare the expected time of arrival of a message with the actual time of arrival of the message as indicated to the control means by the reception and synchronization means, and to offset a time reference provided by the clock in dependence on said comparison.

22. A receiver for synchronizing its clock substantially every first period of time via an intermittent sequence of messages, transmitted by a transmitter, wherein said sequence of intermittent messages are in groups of messages, each group being separated from the next group by a first period of time and comprising a plurality of messages in series, each message in a group being separated from an adjacent message in that group by a second period of time, comprising:

control means arranged to control the operation of the receiver in dependence on the intermittent sequence as updated by received ones of the transmitted intermittent sequence of messages comprising control information indicative of a variation in the sequence of intermittent messages;

a clock for providing a time reference to the control means; and receiver and synchronization means responsive, when enabled, to a received message to indicate to the control means the reception of said message, wherein said control means is arranged to enable power conservation within the receiver for a period of time dependent upon the intermittent sequence, and any variation thereof, said period of time being such that power conservation is disabled to receive a message in each of the groups of the sequence.

23. A receiver as claimed in claim 22, wherein the variation in the sequence of intermittent messages is communicated to the receiver by the reception of a control message as one of the intermittent sequence of messages, said control message including parameters for informing variation in any one or more of the first period of time, the second period of time and the number of messages in a group.

24. A receiver as claimed in claim 22, wherein the messages in the intermittent sequence of messages comprises control messages which vary the sequence of intermittent message and data messages having a payload containing data which do not vary the sequence of intermittent messages.

25. A receiver as claimed in claim 22, arranged, while in Park Mode, to receive a wake up message for waking the receiver from Park Mode to receive a page message at a subsequent time wherein the wake up message is one of the intermittent sequence of messages.

26. A receiver as claimed in claim 22, wherein said control means enables said receiver and synchronization means, to receive a message in the sequence, for a predetermined duration.

27. A receiver as claimed in claim 26, wherein said control in the absence of an indication from the receiving and synchronizing means that a due message has been received, re-enables said receiver and synchronization means to receive a following message.

28. A receiver as claimed in claim 22, wherein said control means enables said receiver and synchronization means, to receive a message in the sequence, for a predetermined duration and in the absence of an indication from the receiving and synchronizing means that a due message has been received, re-enables said receiver and synchronization means to receive a following message in the same group.

29. A receiver as claimed in claim 22, wherein said control means enables said receiver and synchronization means, to receive a message in the sequence, for a predetermined duration and in the absence of an indication from the receiving and synchronizing means that a due message has been received, re-enables said receiver and synchronization means to receive a following message in the following group.

30. A receiver as claimed in claim 29, wherein said control means re-enablement is intermittent, the interval between enablement depending upon the second time period for the group.

31. A computer comprising a receiver as claimed in claim 22.

32. A mobile telephone comprising a receiver as claimed in claim 22.

33. An accessory for a mobile telephone comprising a receiver as claimed in claim 22.

34. A receiver for synchronizing its clock substantially every first period of time via an intermittent sequence of messages, transmitted by a transmitter, wherein said sequence of intermittent messages are in groups of messages, each group being separated from the next group by a first period of time and comprising a plurality of messages in series, each message in a group being separated from an adjacent message in that group by a second period of time, comprising:

control means arranged to control the operation of the receiver in dependence on the intermittent sequence as updated by received ones of the transmitted intermittent sequence of messages comprising control information indicative of a variation in the sequence of intermittent messages;

a clock for providing a time reference to the control means; and receiver and synchronization means responsive, when enabled, to a received message to indicate to the control means the reception of said message, wherein said control means is arranged to enable power conservation within the receiver for a period of time dependent upon the intermittent sequence, and any variation thereof, said period of time being such that power conservation is disabled to receive a message in each of the groups of the sequence, wherein said control means is arranged to compare the expected time of arrival of a message with the actual time of arrival of the message as indicated to the control means by the reception and synchronization means, and to offset a time reference provided by the clock in dependence on said comparison.

35. A receiver, for synchronizing its clock substantially every first period of time via an intermittent sequence of broadcast synchronization messages, transmitted by a transmitter, for synchronizing a clock in the receiver to a clock in the transmitter, wherein said sequence of intermittent synchronization messages are in groups of synchronization messages, each group being separated from the next group by a first period of time and comprising a plurality of synchronization messages in series, each synchronization message in a group being separated from an adjacent synchronization message in that group by a second period of time, comprising:

control means arranged to control the operation of the receiver in dependence on received ones of the transmitted intermittent sequence of synchronization messages comprising control information indicative of a variation in the sequence of intermittent synchronization messages;

a clock for providing a time reference to the control means; and receiver and synchronization means responsive, when enabled, to a received synchronization message to indicate to the control means the reception of said synchronization message, wherein said control means is arranged to disable said receiver and synchronization means for a period of time dependent upon the intermittent sequence, and any variation thereof, and to enable said receiver and synchronization means to receive a synchronization message in each of the groups in the sequence.

36. An accessory for a mobile communications device comprising a receiver as claimed in claim 35.

37. A receiver for synchronizing its clock substantially every first period of time via an intermittent sequence of broadcast synchronization messages, transmitted by a transmitter, for synchronizing a clock in the receiver to a clock in the transmitter, wherein said sequence of intermittent synchronization messages are in groups of synchronization messages, each group being separated from the next group by a first period of time and comprising a plurality of synchronization messages in series, each synchronization message in a group being separated from an adjacent synchronization message in that group by a second period of time, comprising:

control means arranged to control the operation of the receiver in dependence on received ones of the transmitted intermittent sequence of synchronization messages comprising control information indicative of a variation in the sequence of intermittent synchronization messages;

a clock for providing a time reference to the control means; and receiver and synchronization means responsive, when enabled, to a received synchronization message to indicate to the control means the reception of said synchronization message, wherein said control means is arranged to disable said receiver and synchronization means for a period of time dependent upon the intermittent sequence, and any variation thereof, and to enable said receiver and synchronization means to receive a synchronization message in each of the groups in the sequence, wherein said control means is arranged to compare the expected time of arrival of a message with the actual time of arrival of the message as indicated to the control means by the reception and synchronization means, and to offset a time reference provided by the clock in dependence on said comparison.

38. A receiver for synchronizing its clock substantially every first period of time via an intermittent sequence of broadcast synchronization messages, transmitted by a transmitter, for synchronizing a clock in the receiver to a clock in the transmitter, wherein said sequence of intermittent synchronization messages are in groups of synchronization messages, each group being separated from the next group by a first period of time and comprising a plurality of synchronization messages in series, each synchronization message in a group being separated from an adjacent synchronization message in that group by a second period of time, comprising:

control means arranged to control the operation of the receiver in dependence on the intermittent sequence as updated by received ones of the transmitted intermittent sequence of synchronization messages comprising control information indicative of a variation in the sequence of intermittent synchronization messages;

a clock for providing a time reference to the control means; and receiver and synchronization means responsive, when enabled, to a received synchronization message to indicate to the control means the reception of said synchronization message, wherein said control means is arranged to enable power conservation within the receiver for a period of time dependent upon the intermittent sequence, and any variation thereof, said period of time being such that power conservation is disabled to receive a synchronization message in each of the groups of the sequence.

39. An accessory for a mobile communications device comprising a receiver as claimed in claim 38.

40. A receiver for synchronizing its clock substantially every first period of time via an intermittent sequence of broadcast synchronization messages, transmitted by a transmitter, for synchronizing a clock in the receiver to a clock in the transmitter, wherein said sequence of intermittent synchronization messages are in groups of synchronization messages, each group being separated from the next group by a first period of time and comprising a plurality of synchronization messages in series, each synchronization message in a group being separated from an adjacent synchronization message in that group by a second period of time, comprising:

control means arranged to control the operation of the receiver in dependence on the intermittent sequence as updated by received ones of the transmitted intermittent sequence of synchronization messages comprising control information indicative of a variation in the sequence of intermittent synchronization messages;

a clock for providing a time reference to the control means; and receiver and synchronization means responsive, when enabled, to a received synchronization message to indicate to the control means the reception of said synchronization message, wherein said control means is arranged to enable power conservation within the receiver for a period of time dependent upon the intermittent sequence, and any variation thereof, said period of time being such that power conservation is disabled to receive a synchronization message in each of the groups of the sequence, wherein said control means is arranged to compare the expected time of arrival of a message with the actual time of arrival of the message as indicated to the control means by the reception and synchronization means, and to offset a time reference provided by the clock in dependence on said comparison; and wherein control means is arranged to vary the sequence of intermittent messages by varying the first time period between the transmission of a first group of messages and a second successive group of messages by an amount such that the time of transmission of a first message in the second group after the time variation would have coincided with the expected time of transmission of a second message in the second group in the absence of the time variation.

41. A transmitter, for transmitting an intermittent sequence of messages each of which is capable of synchronizing a clock in a receiver to a clock in the transmitter, wherein said sequential messages are in groups, each group being separated from the next group by a first period of time and comprising a plurality of messages in series, each of the plurality of messages in a group being separated from an adjacent message in that group by a second period of time, comprising:

transmission means for transmitting each of said sequential messages; and control means arranged to provide, when there is a variation in the sequence of messages, control information, for transmission in at least one sequential message, that informs the at least one receiver of a variation in the sequence of messages, and thereby maintains, after the variation, the synchronization of the clock in the receiver to the clock in the transmitter, the control information including one or more parameters for informing a variation in one or more of the first period of time, the second period of time and the number of messages in a group; and wherein said control means is arranged to vary the sequence of intermittent messages by varying the first time period between the transmission of a first group of messages and a second successive group of messages by an amount such that the time of transmission of a first message in the second group after the time variation would have coincided with the expected time of transmission of a second message in the second group in the absence of the time variation.

42. A transmitter as claimed in claim 41, wherein for said first and second groups, said series of messages within each of said pair of groups are separated by equal second time periods.

43. A mobile telephone comprising a transmitter as claimed in claim 41.

44. An accessory for a mobile telephone comprising a transmitter as claimed in claim 41.

45. A receiver for synchronizing its clock substantially every first period of time via an intermittent sequence of messages, transmitted by a transmitter, wherein said sequence of intermittent messages are in groups of messages, each group being separated from the next group by a first period of time and comprising a plurality of messages in series, each message in a group being separated from an adjacent message in that group by a second period of time, comprising:

control means arranged to control the operation of the receiver in dependence on the intermittent sequence as updated by received ones of the transmitted intermittent sequence of messages comprising control information indicative of a variation in the sequence of intermittent messages;

a clock for providing a time reference to the control means; and receiver and synchronization means responsive, when enabled, to a received message to indicate to the control means the reception of said message, wherein said control means is arranged to enable power conservation within the receiver for a period of time dependent upon the intermittent sequence, and any variation thereof, said period of time being such that power conservation is disabled to receive a message in each of the groups of the sequence, wherein a control message has a payload comprising a first parameter specifying the first period of time after variation, a second parameter specifying the second period of time after variation and a third parameter specifying the number of messages in a group after variation and said receiver extracts said parameter values therefrom.

* * * * *

UNITED STATES PATENT AND TRADEMARK OFFICE
CERTIFICATE OF CORRECTION

| | |
|---|---|
| PATENT NO. | : 6,959,013 B1 |
| APPLICATION NO. | : 09/404654 |
| DATED | : October 25, 2005 |
| INVENTOR(S) | : Thomas Müller et al. |

It is certified that error appears in the above-identified patent and that said Letters Patent is hereby corrected as shown below:

Title page,
Item [30], Foreign Application Priority Data, replace "(DE)" with -- (GB) --.

Signed and Sealed this

Twenty-seventh Day of June, 2006

JON W. DUDAS
*Director of the United States Patent and Trademark Office*